United States Patent [19]

Penzel et al.

[11] Patent Number: 5,462,978

[45] Date of Patent: Oct. 31, 1995

[54] USE OF UNSATURATED SULFONIC ACID POLYMERS AS SPRAY DRYING ASSISTANTS

[75] Inventors: Erich Penzel, Ludwigshafen; Gernot Franzmann, Bobenheim; Maximilian Angel, Schifferstadt; Joachim Pakusch, Ludwigshafen; Bernhard Schuler, Mannheim, all of Germany

[73] Assignee: BASF Aktiengesellschaft, Ludwigshafen, Germany

[21] Appl. No.: 254,767

[22] Filed: Jun. 6, 1994

[30] Foreign Application Priority Data

Jun. 18, 1993 [DE] Germany ............... 43 20 220.9

[51] Int. Cl.[6] .............. B01D 1/18; C08L 41/00; C04B 26/04
[52] U.S. Cl. .............. 523/342; 524/3; 525/212; 526/287
[58] Field of Search ............... 523/342; 524/3; 525/212; 526/287

[56] References Cited

U.S. PATENT DOCUMENTS

| | | |
|---|---|---|
| 3,043,790 | 7/1962 | Sanders . |
| 3,196,122 | 7/1965 | Evans . |
| 3,239,479 | 3/1966 | Roenicke et al. . |
| 3,965,032 | 6/1976 | Gibbs et al. . |
| 4,340,510 | 7/1982 | Howanietz et al. . |
| 5,145,625 | 9/1992 | Dotzauer et al. . |

FOREIGN PATENT DOCUMENTS

| | | |
|---|---|---|
| 0003235 | 8/1979 | European Pat. Off. . |
| 0078449 | 5/1983 | European Pat. Off. . |
| 0104378 | 4/1984 | European Pat. Off. . |
| 0262326 | 4/1988 | European Pat. Off. . |
| 0407889A1 | 1/1991 | European Pat. Off. . |
| 0467103A2 | 1/1992 | European Pat. Off. . |
| 2214410 | 10/1973 | Germany . |
| 3338431 | 5/1985 | Germany ............... 524/3 |
| 4118007A1 | 3/1992 | Germany . |
| 4206429 | 2/1993 | Germany . |
| 4139602 | 3/1993 | Germany . |
| 051246 | 3/1993 | Japan . |
| 1505558 | 3/1978 | United Kingdom . |

*Primary Examiner*—David Buttner
*Attorney, Agent, or Firm*—Oblon, Spivak, McClelland, Maier & Neustadt

[57] ABSTRACT

Polymers I comprising from 15 to 80% by weight of monomers of the general formula I

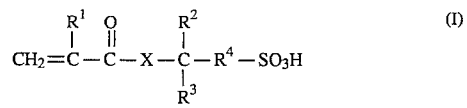

where $R^1$, $R^2$ and $R^3$ are each $C_1$–$C_3$-alkyl, $R^4$ is $C_1$–$C_5$-alkyl and X is O or NH, and from 20 to 85% by weight of other monomers capable of undergoing free radical copolymerization are used as assistants in the spray drying of aqueous dispersions of polymers II which differ from the polymers I.

13 Claims, No Drawings

USE OF UNSATURATED SULFONIC ACID POLYMERS AS SPRAY DRYING ASSISTANTS

The present invention relates to the use of polymers I which are composed of, in polymerized form, from 15 to 80% by weight of at least one monomer of the general formula I and/or the salts thereof (monomers a)

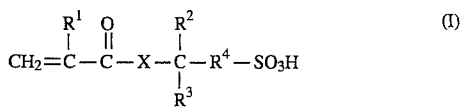

where $R^1$, $R^2$ and $R^3$ independently of one another are each H or $C_1$–$C_3$-alkyl, $R^4$ is $C_1$–$C_5$-alkylene and X is O or NH, and from 20 to 85% by weight of at least one monomer capable of undergoing free radical copolymerization (monomers b), with the proviso that the average molar solubility of the components of the mixture of all the monomers b polymerized ($S^b$) at 25° C. in water is lower than the correspondingly defined molar solubility of the components of the mixture of all the monomers a polymerized ($S^a$), as assistants in the spray drying of aqueous dispersions of polymers II which differ from the polymers I. $S^a$ and $S^b$ preferably differ by at least a factor of 1.2.

The average molar solubility of the components of the mixture is understood as meaning the sum of the molar solubilities of each individual component of the mixture, multiplied by the molar fraction of its frequency in the mixture.

The present invention furthermore relates to the polymer powders which are obtained in the course of the spray drying and are redispersible in water, to the use thereof as additives in mineral binders or as binders of synthetic resin renders and to the preparation of polymers I and the spray drying of dispersions of polymers II.

Mineral binders are pulverulent inorganic substances, such as lime, cement or gypsum, which are converted into their ready-to-use form while stirring with water, said form solidifying in a stone-like manner as a function of time when left to stand in the air or under water. Usually, they are used for the production of mineral building materials, such as mortars or concretes, by adding finely divided or coarser additives, such as sand or stones, during mixing with water.

The use of a very wide range of finely divided polymers (the term polymer is intended to include those high molecular weight compounds which are obtainable by free radical polymerization of unsaturated starting monomers) as modifying additives in mineral binders is generally known (for example from U.S. Pat. No. 4,340,510, British Patent 1,505, 558, U.S. Pat. Nos. 3,196,122, 3,043,790 or 3,239,479).

These finely divided modified polymers are usually introduced in the form of their aqueous polymer dispersions. The advantages of this procedure include the fact that the aqueous polymer dispersion, on the one hand, contains the polymers in a particularly finely divided form implying a binding action and, on the other hand, as a dispersing medium, contains the water in any case required for mixing. Owing to these properties, some of the aqueous polymer dispersions have even entirely replaced the mineral binders, for example in the area of synthetic resin renders.

However, the disadvantage of the application form aqueous polymer dispersion is that it is not completely satisfactory as a commercial form. Thus, its transport to the place of use always involves not only the transport of the modified polymer but also the transport of the (mixing) water, which is readily available everywhere, and, on the other hand, it can be added to the mineral binding material only at the place of use, since otherwise said material hardens before use.

The application form of the modifying polymer additive which is most advantageous from the abovementioned points of view is therefore that of the polymer powder which is redispersible in an aqueous medium (cf. for example DE-A 42 06 429). Together with the other mortar, concrete or render components, it is possible to prepare therefrom commercially suitable dry compositions which can be stored and need merely be stirred with water for conversion into the ready-to-use form.

A particularly advantageous method for converting an aqueous polymer dispersion into a redispersible polymer powder is the method of spray drying, in which the polymer dispersion is sprayed in a warm air stream and dried. The drying air and the sprayed dispersion are preferably fed cocurrent through the drier (cf. for example EP-A 262 326 or EP-A 407 889).

However, polymer powders which can be satisfactorily redispersed in an aqueous medium are obtained by the spray drying method as a rule only when the outlet temperature $T_A$ of the drying air is below the minimum film formation temperature MFT of the aqueous polymer dispersion, the latter usually differing from the static glass transition temperature $T_g$ (midpoint temperature according to ASTM D 3418-82) of the dispersed polymer by only a few degrees (cf. EP-A 262 326 and Ullmanns Encyklopädie der technischen Chemie, Vol. 19, 4th Edition, Verlag Chemie, Weinheim (1980), pages 17 and 18). In this publication, the glass transition temperature is always understood as being in $T_g$, unless expressly stated otherwise.

Since the polymers to be used for modifying mineral binders or as binders for synthetic resin renders generally have a glass transition temperature below 60° C. (cf. for example U.S. Pat. No. 4,340,510), in the absence of spray assistants the spray drying method for the preparation of their redispersible polymer powders can be used only in an uneconomical temperature range, if at all (with increasing difference between inlet and outlet temperature of the drying air, the spray drying can be operated in an increasingly economical manner, outlet temperatures of from 30° to 90° C., preferably from 50° to 70° C., being particularly advantageous). Spray assistants are generally understood as meaning those substances whose presence in the aqueous polymer dispersion to be spray dried permits spray drying to be carried out essentially without loss of redispersibility in an aqueous medium and essentially without the formation of wall deposits, at an outlet temperature $T_A$ of the drying air which is above the MFT of the aqueous polymer dispersion containing no spray assistant.

EP-A 78 449 and EP-A 407 889 disclose the use of naphthalenesulfonic acid/formaldehyde condensates and phenolsulfonic acid/formaldehyde condensates, respectively, as spray assistants. However, the disadvantage of these spray assistants is that they are colored. Accordingly, colored polymer powders are obtained in the spray drying, which is a disadvantage, for example, when said powders are used in white renders or mineral tile adhesives.

DE-A 41 18 007 recommends condensates of sulfonated phenols, urea, further organic nitrogen bases and formaldehyde as spray assistants. Although the resulting polymer powders are snow-white immediately after spray drying and are satisfactorily redispersible in an aqueous medium, they tend subsequently to become colored in the strongly alkaline medium, as is generally typical of mineral binders, and in the presence of metal ions. Moreover, in this case prolonged storage reduces the redispersibility since the powder particles tend to stick to one another (block) under the weight of the powder itself.

EP-A 467 103 discloses, as spray assistants, completely or partly neutralized water-soluble copolymers which, in addition to hydrophobic monomers, contain from 50 to 80 mol % of carboxyl-containing monomers as polymerized units. Although the polymer powders obtainable by means of these spray assistants are snow-white and are satisfactorily redispersible in an aqueous medium, the disadvantage is that no synthetic resin renders having completely satisfactory water resistance can be formulated on the basis of such polymer powders.

This problem of water resistance is of a general nature and presumably due to the fact that, in order to ensure satisfactory redispersibility in an aqueous medium, a spray assistant must have a certain hydrophilic character, which is in virtually insoluble contradiction to the requirement of satisfactory water resistance of the corresponding synthetic resin render and leads to the fact that the water resistance of the render based on the spray assistant-free aqueous polymer dispersion is usually higher than the water resistance of the render based on the redispersed spray-dried polymer powder containing spray assistant.

This also applies to the spray assistants based on vinylpyrrolidone/vinyl acetate (EP-A 78 449) or on polyvinyl alcohol (DE-A 22 14 410).

A further disadvantage of the prior art spray assistants is that they are not neutral with regard to the time of solidification of the modified mortars or concretes but, as a rule, greatly retard the solidification.

It is an object of the present invention to provide spray assistants for the preparation of polymer powders which are redispersible in an aqueous medium, which spray assistants do not have the disadvantages of the prior art spray assistants and in particular can be used for the preparation of spray-dried polymer powders which are suitable for the preparation of synthetic resin renders having high water resistance.

We have found that this object is achieved by using the polymers I defined at the outset as spray assistants. Their use for stabilizing aqueous polymer dispersions was already known from U.S. Pat. No. 3,965,032.

The polymers I preferably contain, as polymerized units, monomers a in which $R^1$, $R^2$ and $R^3$ independently of one another are each H or $CH_3$. Monomers a in which X is NH are also advantageous. $R^4$ is advantageously $C_1$–$C_3$-alkylene. A very particularly preferably used monomer a is 2-acrylamido-2-methylpropanesulfonic acid (or the salts thereof), ie. the monomer of the general formula I where $R^1$ is H, $R^2$ and $R^3$ are each $CH_3$, $R^4$ is —$CH_2$— and X is NH. Suitable monomers a in salt form are, in particular, alkali metal and alkaline earth metal salts, as well as salts which are obtainable by neutralizing the free acid by means of organic amines or ammonia. Polymers I which are particularly advantageous for the purposes of the present invention are those which contain from 20 to 60, particularly preferably from 25 to 40, % by weight of polymerized monomers a.

Suitable monomers b are all monomers which are capable of undergoing free radical polymerization and differ from the monomers a. These are in particular monoethylenicallyunsaturated monomers, such as olefins, e.g. ethylene or propylene, vinyl aromatic monomers, such as styrene, α-methylstyrene, o-chlorostyrene or vinyltoluenes, esters of vinyl alcohol and monocarboxylic acids of 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids of, preferably, 3 to 6 carbon atoms, in particular acrylic acid, methacrylic acid, maleic acid, fumaric acid and itaconic acid, with alkanols of in general 1 to 12, preferably 1 to 8, in particular 1 to 4, carbon atoms, in particular methyl, ethyl, n-butyl, isobutyl, tert-butyl and 2-ethylhexyl acrylates and methacrylates, dimethylmaleate or n-butyl maleate, the nitriles of the abovementioned α,β-monoethylenically unsaturated carboxylic acids, such as acrylonitrile, and the $C_4$–$C_8$-conjugated dienes, such as 1,3-butadiene and isoprene. The stated monomers b generally form the main monomers b, which usually account for more than 50% by weight, based on the total amount of the monomers b. Monomers b which, when polymerized alone, usually give homopolymers which have high water solubility are normally only polymerized as modifying monomers in amounts of less than 50, as a rule from 0 to 20, preferably from 0 to 10, % by weight, based on the total amount of the monomers b.

Examples of such monomers b are α,β-monoethylenicallyunsaturated mono- and dicarboxylic acids of 3 to 6 carbon atoms and amides thereof, e.g. acrylic acid, methacrylic acid, maleic acid, fumaric acid, itaconic acid, acrylamide and methacrylamide, the monoesters of these carboxylic acids with polyhydric alcohols, such as hydroxyethyl acrylate and hydroxypropyl acrylate, as well as vinylsulfonic acid and N-vinylpyrrolidone.

It has proven advantageous to choose the composition of the monomers b constituting the polymer I so that it is chemically similar to the monomer composition of the polymer II of the aqueous dispersion to be spray-dried.

Accordingly, polymers I which are particularly advantageous, for example, for the spray drying of aqueous dispersions of polymers II which, in polymerized form, are composed mainly of esters of α,β-monoethylenically unsaturated carboxylic acids of 3 to 6 carbon atoms with $C_1$–$C_2$-alkanols, styrene and/or vinyltoluenes are those which contain from 20 to 85, preferably from 40 to 80, particularly preferably from 60 to 75, % by weight of at least one monomer b selected from the group consisting of esters of α,β-monoethylenically unsaturated $C_3$–$C_6$-carboxylic acids and $C_1$–$C_{12}$-alkanols, styrene, vinyltoluenes and acrylonitrile, as polymerized units. The amount of the monomers a in these cases is from 15 to 80, preferably from 20 to 60, particularly preferably from 25 to 40, % by weight. They may contain, as polymerized further monomers b (monomers b'), up to 10% by weight of one or more monomers selected from the group consisting of α,β-monoethylenically unsaturated $C_3$–$C_6$-carboxylic acids and amides thereof and monoesters of polyhydric alcohols of 2 to 6 carbon atoms. However, the polymers I preferably contain no monomers b' as polymerized units. On the other hand, polymers I based on vinyl esters as monomers b are advantageously used for the spray drying of aqueous dispersions of polymers II which contain, for example, mainly esters of vinyl alcohol and lower carboxylic acids (as a rule $C_1$–$C_5$-carboxylic acids) as polymerized units.

According to the invention, the polymer I is to be chosen so that its MFT is above that of the polymer II of the aqueous dispersion to be spray-dried, ie. as a rule the polymer I was chosen so that its glass transition temperature is above the glass transition temperature of the polymer II of the aqueous dispersion to be spray-dried.

Usually, therefore, the amounts by weight, based on the total amount of polymerized monomers b, of the various monomers b polymerized in the polymer I are chosen so that, according to Fox's equation for a polymer composed only of the total amount of the polymerized monomers b in polymerized form, the resulting glass transition temperature $T_g^b$ is above the glass transition temperature of the polymer II of the dispersion to be spray-dried.

According to Fox (T. G. Fox, Bull. Am. Phys. Soc. (Ser. II) 1 (1956), 123), the following is a good approximation of the glass transition temperature of copolymers:

$$\frac{1}{Tg} = \frac{X^1}{Tg^1} + \frac{X^2}{Tg^2} + \ldots \frac{X^n}{Tg^n}$$

where $X^1, X^2, \ldots, X^n$ are the mass fractions $1, 2, \ldots, n$ and $Tg^1, Tg^2, \ldots, Tg^n$ are the glass transition temperatures of the polymers composed in each case only of one of the monomers $1, 2, \ldots, n$, in degrees Kelvin. The glass transition temperatures of these homopolymers of the monomers b are known and are described in, for example, J. Brandrup and E. H. Immergut, Polymer Handbook 1st Ed., J. Wiley, New York 1966, 2nd Ed., J. Wiley, New York 1975, and 3rd Ed. J. Wiley, New York, 1989.

Our own investigations have shown that the glass transition temperatures of the homopolymers of the monomers a are above 60° C.

It is particularly advantageous to carry out the spray drying of an aqueous polymer dispersion at an inlet temperature $T_E$ of the warm air stream of from 100° to 200° C., preferably from 120° to 160° C., and an outlet temperature $T_A$ of the warm air stream of from 30° to 90° C., preferably from 50° to 70° C. The spraying of the aqueous polymer dispersion in the warm air stream can be effected, for example, by means of one-material or multi-material nozzles or via a rotating disk. Polymer powders are usually separated off using cyclones or filter separators. The sprayed aqueous polymer dispersion and the warm air stream are preferably fed cocurrent.

Against this background, the polymerized monomers b are generally preferably chosen so that the condition $T_g^b > T_A$ is fulfilled, ie. preferred polymers I are those for which $T_g^b \geq 60°$ C., particularly preferably $T_g^b \geq 80°$ C., very particularly preferably $T_g^b \geq 100°$ C., is fulfilled. Usually however, $T_g^b$ is $\geq 150°$ C. The polymer I particularly preferably comprises, as monomers b, exclusively monomers selected from the group consisting of styrene, methyl methacrylate, acrylonitrile and tert-butyl methacrylate. It very particularly preferably contains, as monomers b, exclusively methyl methacrylate as polymerized units.

The polymers I may be either water-soluble or water-insoluble at 25° C., so that they can be prepared in a conventional manner, for example by the method of free radical solution, suspension or emulsion polymerization. If the polymers I are water-insoluble, they are advantageously prepared by the free radical aqueous emulsion polymerization method. This may be carried out either in the presence of dispersions, for example protective colloids or emulsifiers, or in the absence thereof. The semibatch procedure is advantageously used, ie. the predominant part of the monomers is fed continuously into the polymerization vessel in accordance with the conversion in the polymerization. If emulsifiers are present, usually in an amount of up to 3% by weight, based on the monomers to be polymerized, the monomers a and b are preferably introduced in combination in a form preemulsified in an aqueous medium. If the polymerization is carried out in the absence of dispersants, the monomers a are advantageously fed in at a separate point from the monomers b, since the monomers a are not sufficiently soluble in the monomers b. In this case, the monomers a are preferably fed in as an aqueous solution.

The resulting aqueous dispersion of the polymer I can be directly added to the aqueous dispersion of the polymer II to be spray dried, as such. In this case, of course, the dispersants of the aqueous dispersion of the polymer I must be compatible with those of the aqueous dispersion of the polymer II, which in case of doubt can be checked by a few preliminary experiments. Exclusively anionic and/or nonionic emulsifiers which are generally compatible are preferably used for both.

Conventional emulsifiers are, for example, block copolymers of ethylene oxide and propylene oxide, ethoxylated mono-, di- and trialkylphenols (degree of ethoxylation: from 3 to 50, alkyl radical: $C_4$–$C_9$), ethoxylated fatty alcohols (degree of ethoxylation: from 3 to 50, alkyl radical: $C_8$–$C_{36}$) and alkali metal and ammonium salts of alkylsulfates (alkyl radical: $C_8$–$C_{12}$) and of sulfuric half-esters of ethoxylated alkanols (degree of ethoxylation: from 4 to 30, alkyl radical: $C_{12}$–$C_{18}$) and ethoxylated alkylphenols (degree of ethoxylation: from 3 to 50, alkyl radical: $C_4$–$C_9$), of alkylsulfonic acids (alkyl radical: $C_{12}$–$C_{18}$) and of alkylarylsulfonic acids (alkyl radical: $C_9$–$C_{18}$). Further suitable dispersants are compounds of the general formula II

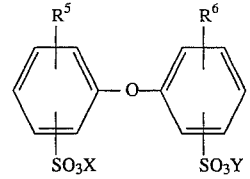

where $R^5$ and $R^6$ are each hydrogen or $C_4$–$C_{14}$-alkyl and are not simultaneously hydrogen and X and Y may be alkali metal ions and/or ammonium ions. $R^5$ and $R^6$ are each preferably straight-chain or branched alkyl of 6 to 18, in particular 6, 12 or 16, carbon atoms or hydrogen, $R^5$ and $R^6$ not both being hydrogen simultaneously. X and Y are each preferably sodium, potassium or ammonium ions, sodium being particularly preferred. Particularly advantageous compounds II are those in which X and Y are each sodium, $R^5$ is branched alkyl of 12 carbon atoms and $R^6$ is hydrogen or $R^5$. Industrial mixtures which contain from 50 to 90% by weight of the monoalkylated product are frequently used, for example Dowfax® 2A1 (trade mark of Dow Chemical Company). The compounds II are generally known, for example from U.S. Pat. No. 4,269,749, and are commercially available. Suitable free radical polymerization initiators are all those which are capable of initiating a free radical aqueous emulsion polymerization. These may be both peroxide, for example alkali metal peroxydisulfates, and azo compounds. Combined systems which are composed of at least one organic reducing agent and at least one peroxide and/or hydroperoxide, for example tert-butyl hydroperoxide and the sodium salt of hydroxymethanesulfinic acid or hydrogen peroxide and ascorbic acid, may also be used. Combined systems which, in addition to a reducing agent and peroxide, contain a small amount of a metal compound which is soluble in the polymerization medium and whose metallic component can occur in a plurality of valency states, for example ascorbic acid/iron(II) sulfate/hydrogen peroxide, are also useful. Usually, the amount of the free radical initiator systems used is from 0.1 to 10% by weight, based on the total amount of the monomers to be polymerized.

The polymerization pressure and polymerization temperature tend to be of minor importance. In general, the process is carried out at from room temperature to 100° C., preferably from 50° to 95° C. It is possible to use superatmospheric or reduced pressure, so that the polymerization temperature may also exceed 100° C. and may be up to 130° C. Preferably, readily volatile monomers, such as ethylene, butadiene or vinyl chloride, are polymerized under superatmospheric pressure.

Those aqueous dispersions of polymers I whose light transmittance (LT) at 25° C. in the state diluted to a solids content of 0.01% by weight is ≧90%, relative to pure water and at a layer thickness of 2.5 cm, are particularly advantageous according to the invention.

According to the invention, it is also advantageous if the K value of the dispersed polymers I is from 20° to 60° at 25° C. in dimethylformamide (DMF). The K value is a relative viscosity number which is determined similarly to DIN 53,726. Here, it expresses the flow rate of pure DMF relative to the flow rate of DMF which contains a 20% strength by weight aqueous dispersion of the polymer I, which dispersion, starting from the fully acidic form of the polymer I, has been brought to a pH of 7 by means of 2 normal aqueous sodium hydroxide solution, in an amount such that it has a solids content of 1% by weight. The K value characterizes the average molecular weight of the polymer (cf. Cellulosechemie 13 (1932), 58– 64, and Kirk-Othmer, Encyclopedia of Chemical Technology, Vol. 23, pages 967–968). A high K value corresponds to a high average molecular weight. Lower K values are obtainable, for example, in a conventional manner by carrying out the polymerization in the presence of effective amounts of molecular weight regulators.

For example, the esters of thioglycolic acid and 2-ethylhexanol or tert-dodecyl mercaptan are suitable as these.

As a rule, the polymers I are added to the aqueous dispersion of the polymers II in amounts of from 5 to by weight, based on the polymer II. If the aqueous polymer dispersion comprising the polymer II is a primary dispersion, ie. a polymer dispersion which is in turn prepared by the free radical aqueous emulsion polymerization method, the polymer I may be added, as a spray assistant, to the monomers constituting the polymer II before, during and/or after the emulsion polymerization. It is preferably added to the prepared aqueous polymer dispersion containing the polymer II in dispersed form. The dispersion can of course also be a secondary dispersion of the polymer II. In this case, the polymer II is prepared, for example, in a conventional manner by the free radical solution polymerization method and is subsequently converted into an aqueous polymer dispersion. In the case of the subsequent addition of the polymer I to the polymer dispersion of the polymer II, which dispersion generally already comprises dispersants (usually in amounts of up to 3% by weight, based on the amount of the polymer II), the polymer I is added preferably in amounts of from 5 to 25, very particularly preferably from 10 to 20, % by weight, based on the amount of the polymer II.

Particularly important modifying additives in mineral binders or renders or exclusive binders for synthetic resin renders are dispersion polymers II which contain, in polymerized form, from 70 to 100% by weight of at least one monomer selected from the group consisting of styrene, vinyltoluenes, esters of α,β-monoethylenically unsaturated carboxylic acids of 3 to 6 carbon atoms and alkanols of 1 to 12 carbon atoms and esters of vinyl alcohol and alkanecarboxylic acids of I to 18 carbon atoms and from 0 to 30% by weight of other copolymerizable monomers, with the proviso that the monomer composition is chosen within this range so that the resulting glass transition temperature $T_g$ according to Fox is ≧60° C., preferably ≧40° C., particularly preferably ≧30° C.

Among these in turn, preferred dispersion polymers II are those which have an appropriate glass transition temperature and contain, in polymerized form, from 50 to 90% by weight of at least one ester of α,β-monoethylenically unsaturated carboxylic acids of 3 to 6 carbon atoms and alkanols of 1 to 12 carbon atoms, with the exception of methyl methacrylate and tert-butyl acrylate, from 10 to 50% by weight of at least one monomer selected from the group consisting of methyl methacrylate, acrylonitrile, tert-butyl acrylate, tert-butyl methacrylate, styrene and vinyltoluenes and from 0 to 5% by weight of one or more monomers selected from the group consisting of α,β-monoethylenically unsaturated carboxylic acids of 3 to 6 carbon atoms and amides thereof.

Particularly if a synthetic resin render having high water resistance is desired, the amount of the monomers of the last-mentioned group is kept as low as possible. The aqueous dispersions of the polymers II are obtainable in a conventional manner by the free radical aqueous emulsion polymerization method. Regarding the dispersants and polymerization initiators to be used, the statements made in connection with the aqueous dispersions of the polymers I are applicable. Their LT value on dilution to 0.01% by weight is preferably <50%. The aqueous dispersions of the polymers II can be dried, with the addition of polymers I, in a simple manner by the spray-drying method to give polymer powders which are redispersible in aqueous medium in a completely satisfactory manner. These redispersible polymer powders are particularly suitable for modifying mineral binders and as binders for synthetic resin renders. They are of course also suitable as binders for emulsion paints and as a base for adhesives and coating materials.

A very particularly noteworthy property of the polymer powders containing the novel spray assistant is that they are suitable for formulating synthetic resin renders whose water resistance is higher than that of the renders formed with the corresponding starting dispersion free of spray assistant.

Dry formulations of synthetic resin renders typically contain from 3 to 15, preferably from 5 to 10, % by weight of redispersible polymer powder, from 17 to 85% by weight of mineral fillers (preferably lime) and/or pigments and from 0 to 5% by weight of assistants, such as antifoams, film formers, thickeners, preservatives or water retention aids.

Examples of suitable mineral fillers and pigments are calcite, mica, kaolin, barite, talc, quartz sand, quartz powder, chalk and titanium dioxide.

Furthermore, coloring may be achieved using organic pigments. Light-weight aggregates, for example vermiculite or pumice, increase the heat insulation of a render. By adding polyamide fibers or polyester fibers, the danger of the formation of fine hairline cracks can be reduced.

The increased water resistance is due to the fact that a hydrophobic unit forms from the novel spray assistant and the polyvalent metal ions of the fillers and/or pigments. Remarkably, the large molar excess, based on the amount of the novel spray assistant contained in the polymer powder, of mineral fillers and/or pigments plays a major role in this respect. The dry formulation of the synthetic resin render advantageously contains up to 60% by weight, based on the polymer binder, of calcium oxide and/or calcium hydroxide.

Further advantageous properties of the novel spray assistants are their lack of color and their essentially neutral behavior with regard to the solidification time of mineral binders, in particular that of cement.

Finally, it should be pointed out that known spray assistants, for example finely divided silica, may of course additionally be present for the purposes of the spray drying according to the invention.

EXAMPLES

1) Preparation of aqueous dispersions of novel polymers I (DPIa to DPId) and of a comparative polymer (DVPI)

DPIa: A solution of 1.76 g of sodium peroxydisulfate in 1,050 g of water was initially taken in a polymerization vessel and heated to the polymerization temperature of 85° C. Feeds I to III were then added to the polymerization vessel simultaneously in the course of 2 hours, beginning at the same time, while maintaining the polymerization temperature. The reaction mixture was then left for 1 hour at 85° C. Thereafter, 30 g of a 20% strength by weight aqueous solution of the sodium salt of hydroxymethanesulfinic acid were added and the mixture was cooled to room temperature.

Feed I:
  280 g of methyl methacrylate and
  1 g of the ester of thioglycolic acid and 2-ethylhexanol;
Feed II:
  120 g of 2-acrylamido-2-methylpropanesulfonic acid
  400 g of water and
  150 g of 20% strength by weight aqueous sodium hydroxide solution;
Feed III:
  15.84 g of sodium peroxydisulfate and
  150 g of water.

The solids content of the resulting aqueous polymer dispersion DPIa was 20% by weight. Its pH was 5.8 and the LT value (25° C.) in 0.01% by weight dilution was 97%. The K value at 25° C. in DMF was 33. DPIb: As for DPIa, except that the initially taken mixture comprised a solution of 12 g of sodium peroxydisulfate in 1,278 g of water and, instead of feeds I to III, only feeds I and II were used:

Feed I:
  300 g of methyl methacrylate
Feed II:
  100 g of 2-sulfoethyl methacrylate and
  319 g of water.

The solids content of the resulting aqueous polymer dispersion DPIb was 20.5% by weight. The pH was 1 and the LT value (25° C.) in 0.01% dilution was about 100%. The K value at 25° C. in DMF was 38. DPIc: As for DPIa, except that the initially taken mixture comprised a solution of 4 g of sodium peroxydisulfate in 1,057 g of water and, instead of feeds I to III, only feeds I and II were used:

Feed I:
  240 g of methyl methacrylate,
  160 g of 3-sulfopropyl methacrylate,
  2.8 g of tert-dodecyl mercaptan,
  2 g of a 20% strength by weight aqueous solution of ethoxylated p-isooctylphenol (degree of ethoxylation: 25)=emulsifier solution 1,
  2.3 g of a 35% strength by weight aqueous solution of the sodium salt of the sulfuric half-ester of ethoxylated p-isooctylphenol (degree of ethoxylation: 25)= emulsifier solution 2, and
  454 g of water;
Feed II:
  8 g of sodium peroxydisulfate and
  100 g of water.

The solids content of the resulting aqueous polymer dispersion DPIc was 20.6% by weight. Its pH was 2.2 and the LT value (25° C.) in 0.01% by weight dilution was about 100%. The K value at 25° C. in DMF was 28. DPId: As for DPIa, except that the initially taken mixture comprised a solution of 12 g of sodium peroxydisulfate in 1,145 g of water and, instead of feeds I to III, only a feed I was used:

Feed I:
  97.6 g of methyl methacrylate (40 mol %),
  302.4 g of 2-acrylamido-2-methylpropanesulfonic acid (60 mol %),
  2.8 g of the ester of thioglycolic acid and 2-ethylhexanol,
  77.9 g of a 25% strength by weight aqueous sodium hydroxide solution (neutralizes one third of the acidic functions),
  2 g of emulsifier solution 1,
  2.3 g of emulsifier solution 2 and
  491 g of water.

The solids content of the resulting aqueous polymer dispersion DPId was 20.3% by weight. Its pH was 1.5 and the LT value (25° C.) in 0.01% by weight dilution was about 100%. The K value at 25° C. in DMF was 20. DVPI: As for DPId, except that feed I now contained 74.8 g of methyl methacrylate (40 mol %) and 225.2 g of methacrylic acid (60 mol %) instead of the amounts of methyl methacrylate and 2-acrylamido-2-methylpropanesulfonic acid used for DPId. Furthermore, 139.2 g of the 25% strength by weight aqueous sodium hydroxide solution were used in feed 1, instead of the 77.9 g (neutralizes a third of the acidic functions).

The solids content of the resulting aqueous polymer dispersion DVPI was 20.2% by weight. Its pH was 5.9 and the LT value (25° C.) in 0.01% by weight dilution was 90%. The K value at 25° C. in DMF was 40.

2) Preparation of aqueous dispersions of polymers II (DPIIa to DPIIc)

DPIIa: A solution of
  294 g of water,
  7.7 g of a 10% strength by weight aqueous formic acid solution,
  6.6 g of a 20% strength by weight aqueous solution of polyacrylamide,
  3.3 g of sodium bicarbonate,
  11 g of emulsifier solution 1 and
  0.9 g of emulsifier solution 2 was initially taken in a polymerization vessel and heated to the polymerization temperature of 90° C. Thereafter, beginning at the same time, feed I was introduced continuously into the polymerization vessel in the course of 2 hours and feed II in the course of 2.5 hours, while maintaining the polymerization temperature. The polymerization vessel was then left for a further 2 hours at 90° C. Thereafter, the mixture was cooled to room temperature and neutralized with 5.5 g of a 20% strength by weight aqueous calcium hydroxide suspension.

The solids content of the resulting aqueous polymer dispersion DPIIa was 54.7% by weight. Its pH was 8.1 and the LT value (25° C.) was 9% (0.01% by weight dilution). The dispersed polymer PIIa had a glass transition temperature of −1° C.

Feed I:
  682 g of n-butyl acrylate,
  385 g of styrene,
  44 g of a 50% strength by weight aqueous solution of acrylemide,
  73.3 g of a 15% strength by weight aqueous solution of methacrylamide,
  16.5 g of emulsifier solution 1
  22.6 g of emulsifier solution 2 and
  235 g of water.
Feed II:

6.4 g of sodium peroxydisulfate in
180 g of water.

DPIIb: A mixture of 500 g of water,
2.5 g of sodium acetate,
2.5 g of butenol and
10 g of an ethoxylated cellulose (Natrosol® 250 GR)

was heated to the polymerization temperature of 80° C. in a polymerization vessel. Thereafter, first 150 g of feed I and then 10 g of feed II were introduced all at once into the polymerization vessel and polymerization was carried out for 20 minutes at 80° C. Thereafter, beginning at the same time, the remaining amount of feed I was metered in continuously in the course of 3 hours and the remaining amount of feed II in the course of 3.5 hours, while maintaining the 80° C. Stirring was then carried out for a further hour at 80° C., and the mixture was finally cooled to room temperature.

The solids content of the resulting aqueous polymer dispersion DPIIb was 50.2% by weight. Its pH was and the LT value (25° C.) was 20% (0.01% by weight dilution). The dispersed polymer PIIb had a glass transition temperature of −2° C.

Feed I:
600 g of vinyl propionate,
200 g of tert-butyl acrylate,
200 g of n-butyl acrylate,
160 g of a mixture of 150 g of emulsifier solution 1 and 10 g of a block copolymer of ethylene oxide and propylene oxide (molar ratio EO:PO=0.7 and relative number average molecular weight=3,200) and
343 g of water;

Feed II:
5 g of sodium peroxydisulfate in
100 g of water.

DPIIc: A solution of 6000 g of water and
17 g of a 45% strength by weight aqueous solution of the surfactant corresponding to Dowfax 2A1 was heated to the polymerization temperature of 80° C. in a polymerization vessel. Thereafter, 1,087 g of feed I and 108 g of feed II were added in succession to the polymerization vessel all at once, and polymerization was carried out for 30 minutes at 80° C. Thereafter, beginning at the same time, the remaining amounts of feeds I and II were added continuously in the course of 3.5 hours while maintaining the polymerization temperature. The reaction mixture was then left for 4 hours at 80° C. Finally, it was cooled to room temperature and neutralized with 420 g of a 25% strength by weight aqueous sodium hydroxide solution.

The solids content of the resulting aqueous polymer dispersion DPIIc was 50.9%. Its pH was 8 and the LT value (25° C.) was 46% (0.01% by weight dilution). The dispersed polymer PIIc had a glass transition temperature of 60° C.

Feed I:
12150 g of styrene,
2250 g of butadiene,
450 g of a 50% strength aqueous solution of acrylamide,
375 g of acrylic acid,
120 g of tert-dodecyl mercaptan,
117 g of a 45% strength by weight aqueous solution of the surfactant corresponding to Dowfax 2A1,
250 g of a 15% strength by weight aqueous solution of the sodium salt of the sulfuric half-ester of lauryl alcohol and
6033 g of water.

Feed II:
150 g of sodium peroxydisulfate and
200 g of water.

3) Preparation of polymer powders by spray drying of aqueous polymer dispersions The spray drying was carried out in a laboratory drier of the Minor type from Niro, at a rate of 2 kg/h. The aqueous polymer dispersion to be dried was sprayed by means of a rotating disk. The inlet temperature of the drying air was 130° C. and the outlet temperature of the drying air was from 60° to 64° C.

For the spray drying, aqueous polymer dispersions DPIi from 1) were added, as spray assistants SA, to aqueous polymer dispersions DPIIi from 2), and the resulting mixture was brought to a standard solids content of 35% by weight.

The results of the spray drying are shown in Table I below. X is the content of the spray assistant PIi, expressed in % by weight, based on the amount of the polymer PIIi to be spray-dried.

TABLE I

| Powder No. | SA | DPIIi | X | Wall deposit | Powder yield (% by theory) |
|---|---|---|---|---|---|
| 1 | DPIa | DPIIa | 15 | almost none | 89 |
| 2 | DPIb | DPIIa | 10 | almost none | 88 |
| 3 | DPIc | DPIIa | 10 | almost none | 90 |
| 4 | DPIa | DPIIb | 15 | a small amount | 78 |
| 5 | DPIa | DPIIc | 15 | almost none | 83 |
| 6 | DPId | DPIIa | 15 | almost none | 89 |
| 7 | DVPI | DPIIa | 15 | almost none | 90 |

Powders 1 to 6 are completely satisfactorily redispersible in the aqueous medium. Under otherwise identical spray-drying conditions, polymer dispersions DPIIa, DPIIb and DPIIc cannot be spray-dried without the use of spray assistants. A thick wall deposit which is difficult to remove and is not redispersible in the aqueous medium is formed. According to the invention, a particularly small amount of wall deposit forms when the dynamic glass transition temperature $T_{\lambda max}$, defined in DIN 53,445, of the spray assistant is far above $T_E$. Furthermore, the powder yield is particularly advantageous when the MFT of the DPIi is far above $T_A$ (the relevant pH being that of the mixture with the spray-drying polymer dispersion DPIIi).

4) Formulation of synthetic resin renders and investigation of the water resistance of the renders resulting therefrom The following base formulation, consisting of 10 parts by weight of white calcite having a mean particle diameter of 130 μm (Calcidar® 130 from Omya GmbH, Cologne), 33.7 parts by weight of white calcite having a mean particle diameter of 25 μm (Calcidar® 40 from Omya GmbH, Cologne), 10 parts by weight of a mixture of mica, calcite and quartz having a mean particle diameter of 600 μm (Plastorit® 1 from Naintsch Mineralwerke, Graz), 37.4 parts by weight of white calcite having a mean particle diameter of 1,200 μm (Carolith® 1000 from Omya GmbH, Cologne), 3.7 parts by weight of titanium dioxide (Kronos® RN 56 from Kronos Titan GmbH, Leverkusen), 2.5 parts by weight of antifoampowder (Lumiten® E-P 3108 from BASF AG, Ludwigshafen), 0.2 part by weight of cellulose powder (Culminal® MHPC 20000 from Henkel KG, Düsseldorf), 2.5 parts by weight of calcium oxide, 7.5 parts by weight of polymer powder from 3) or dispersion from 2) (calculated as dry substance) as a binder and from 20 to 30 parts by weight of water, to processing consistency, was used.

The render compositions having a strength suitable for processing were applied to an unprimed, highly absorptive Eterplan® sheet and stored in a dry place for 7 days under standard conditions of temperature and humidity. Storage was then carried out for 24 hours under water at room temperature. Thereafter, the water resistance of the render was evaluated on a scale from 1 to 6 (schoolmarking system) on the basis of the adhesion to the substrate and the scratch resistance of the render. Table II shows the results as a function of the binder used.

TABLE II

| Binder | Water resistance |
| --- | --- |
| DPIIA | 2 |
| Powder 1 from 3) | 1 |
| Powder 6 from 3) | 1 |
| Powder 7 from 3) (comparison) | 4 |
| DPIIa + DPIa before spray drying | 1 |

5) Modification of mineral binders

A mixture of 300 g of Portland cement 35F from Märker and 30 g of polymer powder from 3) or 30 g of DPIIi from 2) (calculated as dry material) was stirred with water until standard consistency was reached, after which the setting behavior of the composition was determined according to DIN 1164 using the Vicat needle.

The result is shown in Table III.

TABLE III

| Modifying polymer | Beginning of setting | End of setting |
| --- | --- | --- |
| DPIIa | 6 h | 8 h |
| Powder 1 from 3) | 6 h | 8 h |
| Powder 6 from 3) | 6 h | 8 h |
| Powder 7 from 3) (Comparison) | >90 h | >90 h |

We claim:

1. A process for spray drying aqueous polymer dispersions, comprising:

preparing a mixed polymer dispersion of at least one polymer II and at least one polymer I as a spray assistant, wherein polymer I is comprised of (a) from 15–80% by weight of at least one monomer of formula I or salts thereof:

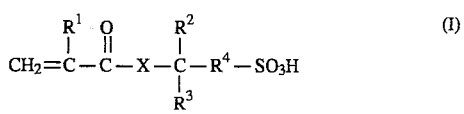

wherein $R^1$, $R^2$ and $R^3$ independently of one another are each hydrogen or $C_{1-3}$ alkyl, $R^4$ is $C_{1-5}$ alkylene and X is O or NH, and (b) from 20–85% by weight of at least one monomer capable of undergoing free radical copolymerization, with the proviso that the average molar solubility of the components of the mixture of all the monomers (b) polymerized at 25° C. in water is lower than the correspondingly defined average molar solubility of the components of the mixture of all the monomers (a) polymerized; and spray drying the mixed polymer dispersion.

2. The process of claim 1, wherein said polymer I contains, as at least one monomer (a), 2-acrylamido-2-methylpropanesulfonic acid or a salt thereof as polymerized units.

3. The process of claim 1, wherein polymer I contains from 20–60% by weight of monomers (a).

4. The process of claim 1, wherein polymer I contains from 20–85% by weight of at least one monomer selected from the group consisting of esters of α,β-monoethylenically unsaturated $C_{3-6}$ carboxylic acids and $C_{1-12}$ alkanols, styrene, vinyltoluenes and acrylonitrile.

5. The process of claim 1, wherein monomers (b) present in polymer I, are selected from the group of monomers in which the glass transition temperature $T_g^b$ of a polymer composed only of monomers (b) would be $\geq 60°$ C.

6. The process of claim 1, wherein monomers (b) are selected from the group consisting of styrene, methylmethacrylate and t-butylmethacrylate.

7. The process of claim 1, wherein monomer (b) is exclusively methylmethacrylate.

8. The process of claim 1, wherein polymer I is added to a dispersion of polymer II which is to be spray dried in the form of an aqueous polymer dispersion whose LT value is $\geq 90\%$.

9. The process of claim 1, wherein polymer I has a K value of from 20–60 at 25° C. in DMF.

10. The process of claim 1, wherein polymer I is employed in an amount of from 5–40% by weight in the dispersion, based on the weight of polymer II.

11. The method of claim 1, wherein polymer II comprises from 70–100% by weight of at least one monomer selected from the group consisting of styrene, vinyltoluenes, esters of α, β-monoethylenically unsaturated carboxylic acids of 3–6 carbon atoms and alkanols of 1–12 carbon atoms and esters of vinyl alcohol and alkanecarboxylic acids of 1–18 carbon atoms and from 0–30% by weight of other copolymerizable monomers, with the proviso that the glass transition temperature $T_g$ of polymer II is $\geq 60°$ C.

12. The method of claim 1, wherein polymer II contains from 50–90% by weight of at least one ester of α,β-monoethylenically unsaturated carboxylic acids of 3–6 carbon atoms and alkanols of 1–12 carbon atoms, with the exception of methylmethacrylate and t-butylacrylate, from 10–50% by weight of at least one monomer selected from the group consisting of methylmethacrylate, acrylonitrile, t-butylacrylate, t-butylmethacrylate, styrene and vinyltoluenes, and from 0–5% by weight of at least one monomer selected from the group consisting of α,β-monomethylenically unsaturated carboxylic acids of 3–6 carbon atoms and amides thereof, with the proviso that the glass transition temperature $T_g$ of polymer II is $\geq .60°$ C.

13. The process of claim 1, wherein said spray drying is conducted with air, the inlet temperature of the spray drying device employed ranging from 100°–200° C. and the outlet temperature ranging from 30°–90° C.

* * * * *